Apr. 3, 1923.
J. F. BEANS
AUTOMOBILE BUMPER
Filed Nov. 4, 1922
1,450,165
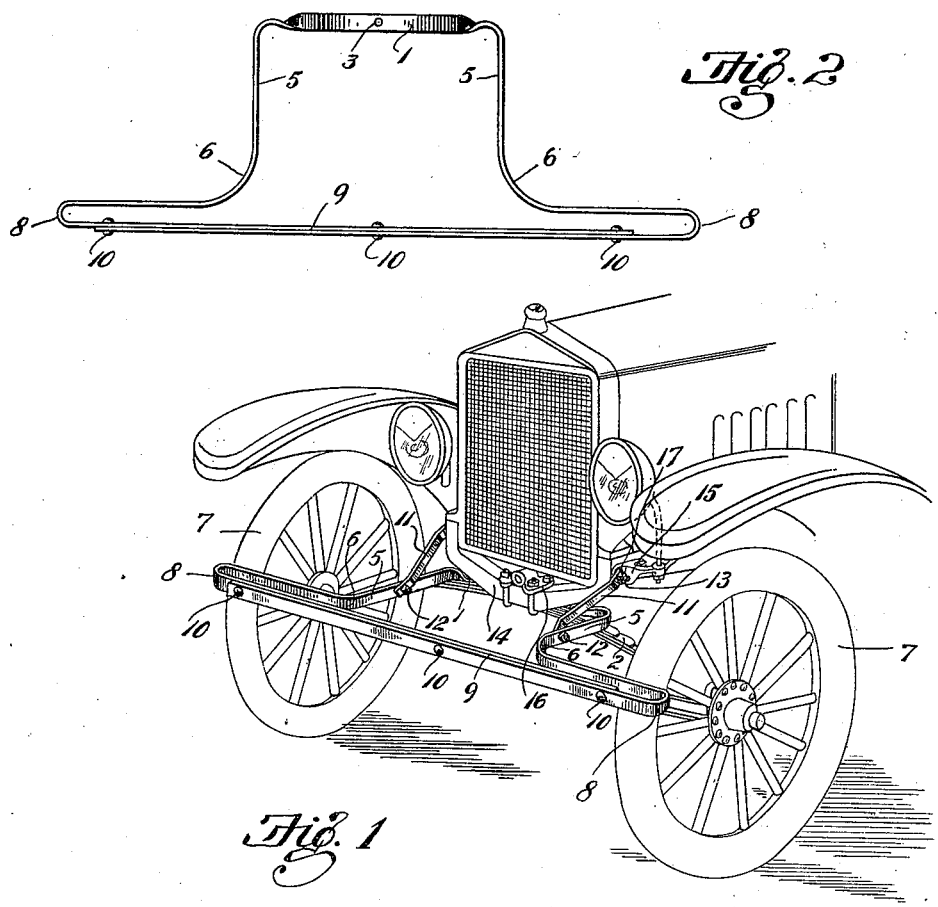
Fig. 2
Fig. 1
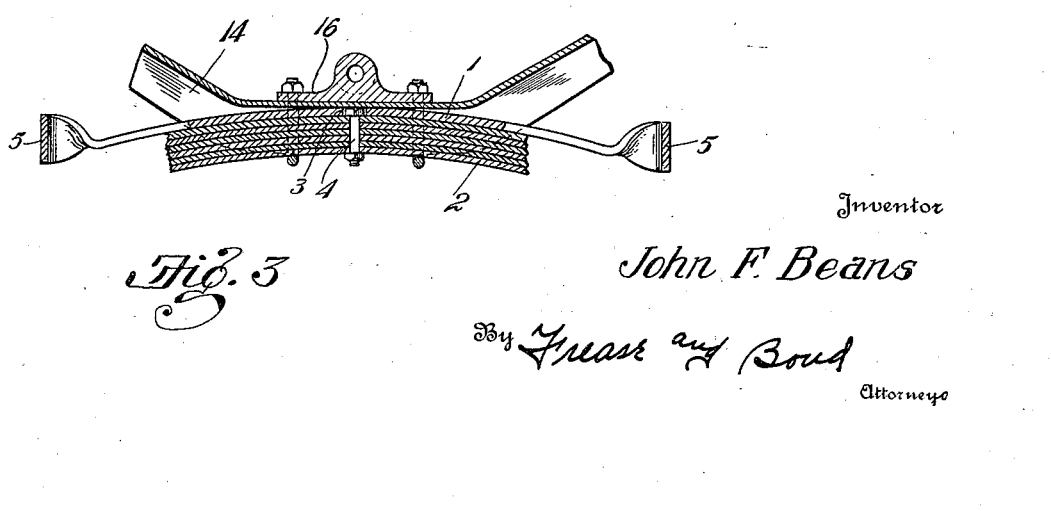
Fig. 3
Inventor
John F. Beans
By Frease and Bond
Attorneys Patented Apr. 3, 1923.

1,450,165

UNITED STATES PATENT OFFICE.

JOHN F. BEANS, OF CANTON, OHIO, ASSIGNOR TO THE BEANS SPRING COMPANY, OF MASSILLON, OHIO, A CORPORATION OF OHIO.

AUTOMOBILE BUMPER.

Application filed November 4, 1922. Serial No. 599,021.

*To all whom it may concern:*

Be it known that I, JOHN F. BEANS, a citizen of the United States, residing at Canton, in the county of Stark and State of Ohio, have invented a new and useful Automobile Bumper, of which the following is a specification.

This invention relates to bumpers for automobiles and more particularly to a bumper especially designed for use upon a Ford automobile, and has for its objects to provide a bumper of this character formed of a single bar of spring steel bent into a shape to produce the maximum amount of resiliency and arranged to be easily and readily attached to a Ford automobile, without requiring the use of any additional bolts, screws or other fastening means at the point where the bumper is attached to the automobile.

The above and other objects may be attained by constructing the bumper in the manner illustrated in the accompanying drawing, in which—

Figure 1 is a perspective view of the front portion of an automobile, showing the improved bumper applied thereto;

Fig. 2, a plan view of the bumper detached; and

Fig. 3, an enlarged detail, sectional view through a portion of the front spring and radiator frame, showing the manner of attaching the bumper thereto.

Similar numerals of reference indicate corresponding parts throughout the drawing.

The bumper is formed of a single bar of spring steel, the central portion of which is slightly curved as at 1, in order to fit snugly upon the top of the front spring 2 of the automobile, and provided with a central aperture 3 of suitable size to receive the head of the usual bolt 4 which connects the several leaves of the front spring together.

At either side of the curved portion 1, the steel bar forming the bumper is twisted into a vertical plane and bent forwardly as at 5, each side of the bumper being then bent outward in a comparatively large radius as at 6, extending outward to a point in front of the front wheels 7 of the automobile as at 8, and then bent half round, the end portions 9 of the rod overlapping throughout substantially their entire length and being connected together at intervals as by the rivets 10.

A pair of angular brace bars 11 are connected to the side portions 5 of the bumper as by the bolts 12, each of these brace bars having an aperture at its free end arranged to receive the usual bolts 13, provided upon the radiator frame 14 for the purpose of attaching the head light brackets 15.

In mounting the bumper upon a Ford automobile, the clip 16 which attaches the radiator 14 to the front spring 2 is removed, and the radiator is jacked up. The curved portion 1 of the bumper is then placed upon the top of the front spring 2 of the automobile, the head of the spring bolt 4 being received in the central aperture 3 of the bumper.

The radiator is then locked into position and the clip 16 replaced, clamping the curved portion of the bumper securely between the top of the front spring and the radiator frame 14, the head of the bolt 4 extending into the opening 3 of the bumper, preventing lateral movement thereof.

The nuts 17 upon the bolts 13 are then removed and the apertures in the upper ends of the brace bars 11 are placed over said bolts, the nuts 17 being replaced and tightened thereon. The bumper will thus be held securely in place upon the forward end of the automobile, being secured at its rear end between the front spring and radiator frame and on each side, by means of the brace bars 11.

It will be obvious that a simple and efficient bumper is thus provided which may be easily and quickly attached to an automobile without requiring mechanical experience or skill and without the use of any bolts, screws or other fastening means, excepting those already provided upon the automobile at the point where the bumper is attached to the automobile.

I claim:—

1. An automobile bumper formed of a single bar of spring steel having a U-shaped, rearwardly extending, central portion for engagement with the front spring of an automobile, the end portions of the bar being overlapped and connected together.

2. An automobile bumper formed of a single bar of spring steel comprising a rearwardly extending, U-shaped portion, provided with a curved central portion for engagement with the front spring of an automobile, the end portions of the bar being overlapped and connected together.

3. An automobile bumper formed of a single bar of spring steel comprising a rearwardly extending, U-shaped portion, provided with a curved central portion for engagement with the front spring of an automobile, the end portions of the bar being overlapped and connected together, said curved portion having an aperture to receive the head of the spring bolt.

JOHN F. BEANS.